United States Patent
Pang et al.

(10) Patent No.: US 12,386,155 B2
(45) Date of Patent: Aug. 12, 2025

(54) ULTRA-WIDE ANGLE LENS SYSTEMS WITH EXTERNAL PUPIL

(71) Applicant: Applied Materials, Inc., Santa Clara, CA (US)

(72) Inventors: Wubin Pang, San Jose, CA (US); Yangyang Sun, San Jose, CA (US); Jinxin Fu, Fremont, CA (US); Samarth Bhargava, Saratoga, CA (US)

(73) Assignee: Applied Materials, Inc., Santa Clara, CA (US)

( * ) Notice: Subject to any disclaimer, the term of this patent is extended or adjusted under 35 U.S.C. 154(b) by 576 days.

(21) Appl. No.: 17/805,623

(22) Filed: Jun. 6, 2022

(65) Prior Publication Data

US 2022/0397744 A1 Dec. 15, 2022

Related U.S. Application Data (60) Provisional application No. 63/209,552, filed on Jun. 11, 2021.

(51) Int. Cl.
| | | |
|---|---|---|
| *G02B 13/06* | (2006.01) | |
| *G02B 13/16* | (2006.01) | |
| *G02B 13/22* | (2006.01) | |
| *G02B 27/00* | (2006.01) | |

(52) U.S. Cl.
CPC ............. *G02B 13/06* (2013.01); *G02B 13/16* (2013.01); *G02B 13/22* (2013.01); *G02B 27/0025* (2013.01)

(58) Field of Classification Search
CPC ........ G02B 13/06; G02B 13/16; G02B 13/22; G02B 27/0025

USPC .......................................................... 359/362
See application file for complete search history.

(56) References Cited

U.S. PATENT DOCUMENTS

| | | | |
|---|---|---|---|
| 7,167,316 B1 | 1/2007 | Gupta et al. | |
| 9,201,222 B2 | 12/2015 | Masuda et al. | |
| 10,277,893 B1 * | 4/2019 | Yoon | H04N 23/90 |
| 10,545,317 B2 | 1/2020 | Park | |
| 2006/0082892 A1 * | 4/2006 | Drazic | H04N 5/7441 |
| | | | 348/E5.137 |
| 2011/0234476 A1 * | 9/2011 | Sugihara | G02C 1/00 |
| | | | 359/630 |
| 2017/0146776 A1 | 5/2017 | Kang et al. | |
| 2019/0227277 A1 | 7/2019 | Tang et al. | |

(Continued)

OTHER PUBLICATIONS

Eckhardt et al. "Digital age sees new demand for the venerable conoscope", pp. 56-59, Sep. 2020, Photonics Spectra, vol. 54, issue 2.*

(Continued)

*Primary Examiner* — Stephone B Allen
*Assistant Examiner* — Boutsikaris Leonidas
(74) *Attorney, Agent, or Firm* — Patterson + Sheridan, LLP (57) ABSTRACT

Embodiments of the present disclosure generally relate to an optical system having a lens system configured to have a wide field of view and high resolution. The optical system includes three or more lens groups with ability to combat optical aberrations and produce a pupil outside of the lens group. The lens system as an image projection system projects a pattern or image rendered on a flat reticle or display of finite distance to the infinity. In an imaging system, the lens system collects light from infinity and forms an image of that object on a sensor.

20 Claims, 5 Drawing Sheets

(56) References Cited

U.S. PATENT DOCUMENTS

2019/0324247 A1    10/2019    Kasahara
2021/0026111 A1*    1/2021    Hudyma ............ G02B 27/0018

OTHER PUBLICATIONS

International Search Report and Written Opinion for International Application No. PCT/US2022/032364 dated Oct. 7, 2022.
Eckhardt, S. et al. "Digital Age Sees New Demand for the Venerable Conoscope," pp. 56-59, Sep. 2020, Photonics Spectra, vol. 54, issue 9.
ZEBASE Optical Design Database User's Guide Version 6.1, pp. 177-178, Apr. 2011, Radiant Zemax, LLC.
"Conoscope Lenses" Web page < http://eckop.com/optics/opticsadvanced-lenses/how-conoscope-lenses-work>, 3 pages, Sep. 22, 2017, retrieved from Internet Archive Wayback Machine < https://web.archive.org/web/20170922073330/http:/eckop.com/optics/opticsadvanced -lenses/how-conoscope- lenses-work/> on Apr. 21, 2023.
Xing C. et al. Design of portable fundus camera system based on mobile phone, Jan. 18, 2019, Proc. SPIE 10839, 9th International Symposium on Advanced Optical Manufacturing and Testing Technologies: Optical Test, Measurement Technology, and Equipment, vol. 10839.
Laikin, Milton "Lens Design" pp. 211-217, Published 2012, CRC Press, United States.
"Conoscope Lenses" Web page < http://eckop.com/optics/opticsadvanced-lenses/how-conoscope-lenses-work>, 5 pages, Mar. 26, 2019, retrieved from Internet Archive Wayback Machine < https://web.archive.org/web/20190326011513/https://eckop.com/optics /opticsadvanced-lenses/how-conoscope-lenses/> on Apr. 21, 2023.
"Conoscopic Lenses—Eckhardt Optics—Facts and Specifications" Web page < http://eckop.com/>, 17 pages, Apr. 20, 2021, retrieved from Internet Archive Wayback Machine https://web.archive.org/web/20210420010728/https://www.eckop.com/ on Apr. 21, 2023.

* cited by examiner

ULTRA-WIDE ANGLE LENS SYSTEMS WITH EXTERNAL PUPIL

CROSS-REFERENCE TO RELATED APPLICATIONS

This application claims benefit of U.S. Provisional Patent Application No. 63/209,552, filed Jun. 11, 2021, which is herein incorporated by reference in its entirety.

BACKGROUND

Field

Embodiments of the present disclosure generally relate to an optical system. More specifically, embodiments described herein provide for an optical system having a lens system configured to have a wide field of view and high resolution.

Description of the Related Art

Optical systems used for imaging or used as light engines are common in the art. The optical systems have many different application, such as to take pictures or for use in augmented reality/virtual reality applications, including with cameras and scanners. The optical systems generally include imaging systems that contain multiples lenses, composite lenses, and films, in order to reduce aberrations caused by imperfections in lenses. Lenses with chromatic aberrations cause "fringes" of color along boundaries that separate dark and bright parts of images.

Conventional optical systems attempting to achieve a wide field of view with a high resolution result in undesired increases in chromatic aberrations. Therefore, there is a need for an apparatus and method that can reduce chromatic aberrations while still maintaining a wide field of view with high resolution.

SUMMARY

In one embodiment, an optical system is provided. The optical system includes a display configured to render an image by projecting a plurality of light waves and a lens system. The lens system includes a first lens group configured to relay the light waves to a center of the lens system, a second lens group adjacent to the first lens group and configured to flatten a field of the light waves; and a third lens group adjacent to the second lens group. The third lens group is configured to form a pupil on a pupil plane outside of the lens system. The optical system further includes a light injection port. The pupil plane is aligned with the light injection port and the light waves are projected to the light injection port.

In another embodiment, a lens system is provided. The lens system includes a first lens group configured to relay a plurality of light waves to a center of the lens system. The first lens group is a double Gauss lens. The lens system includes a second lens group adjacent to the first lens group. The second lens group is a flat-field lens configured to flatten a field of the light waves. The lens system includes a third lens group adjacent to the second lens group. The third lens group includes a bi-convex lens and a positive meniscus lens and is configured to form a pupil on a pupil plane outside of the lens system.

In yet another embodiment, a method of using a lens system is provided. The method includes projecting a plurality of light waves from a display to a lens system. The lens system includes a first lens group configured to relay the light waves to a center of the lens system. The first lens group is a double Gauss lens. The lens system includes a second lens group adjacent to the first lens group. The second lens group is a flat-field lens configured to flatten a field of the light waves. The lens system includes a third lens group adjacent to the second lens group. The third lens group includes a bi-convex lens and a positive meniscus lens and is configured to form a pupil on a pupil plane outside of the lens system. The method further incudes projecting the light waves to a light injection port such that a pupil on a pupil plane is formed outside of the lens system.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to an optical system. More specifically, embodiments described herein provide for an optical system having a lens system configured to have a wide field of view and high resolution.

An optical system having an external pupil is described herein. The optical system is configured to have a wide field of view with high resolution, while decreasing aberrations. The optical system includes a lens system that includes multiple lens groups that projects a pattern or image rendered on a flat reticle or display of finite distance to infinity. Alternatively, the lens system collects light from infinity and forms an image of that object on a flat surface.

The combination of a large field of view, a pupil external of the lens system, and high resolution poses is challenging to fabricate. Large field of view requires high correcting power for off-axis aberrations, which include coma, field curvature, astigmatism, and lateral color. To correct the off-axis aberration, lens systems of symmetry may be implemented. However, achieving an external pupil with the symmetry in design, constitutes a challenge for obtaining wide field angle and large pupil size. As such, the optical system described below allows for large field of view, a pupil external of the lens system, and high resolution.

Figure 1A:
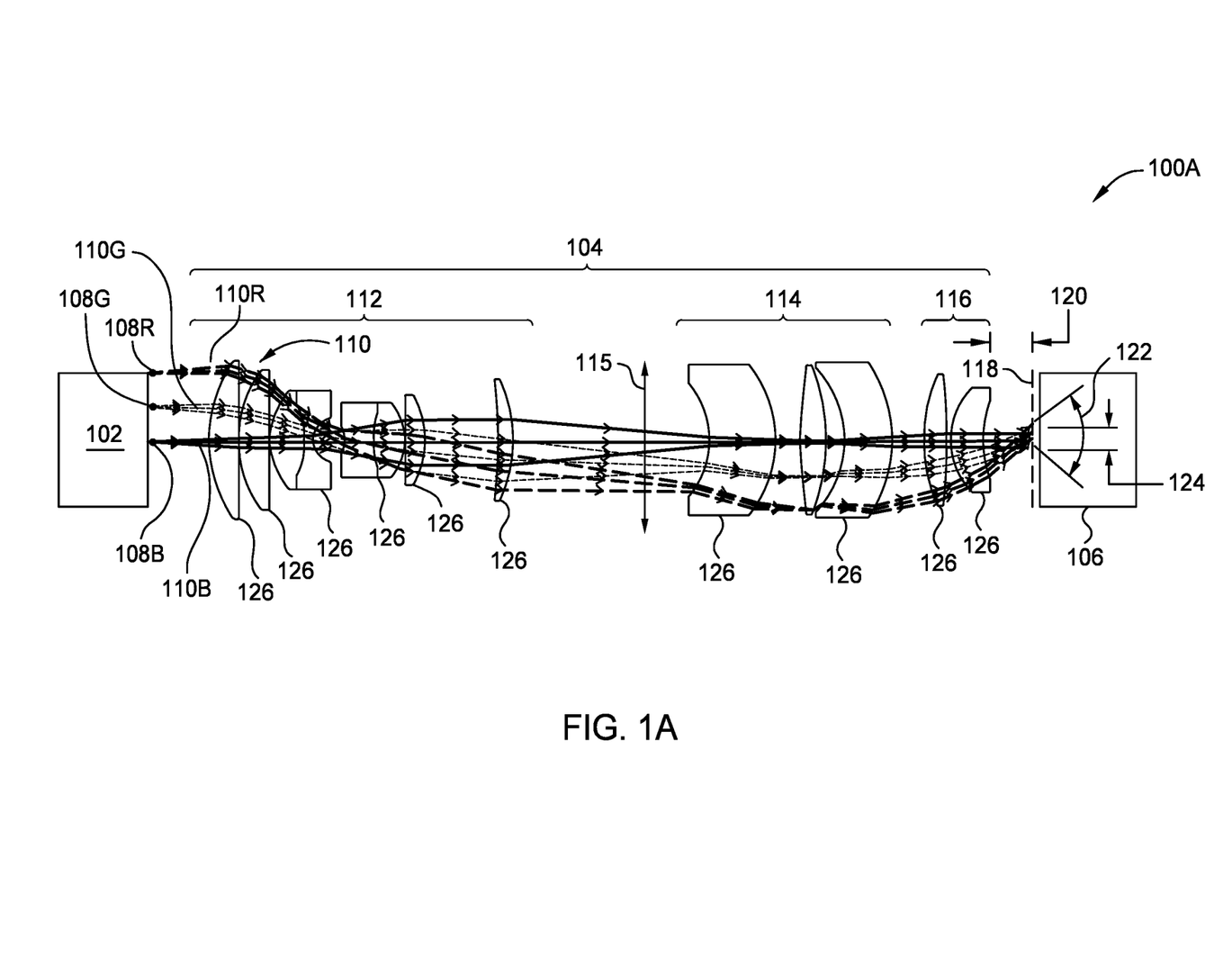
FIGS. 1A and 1B are a schematic, side views of an optical system, according to embodiments described herein.

FIG. 1A is a schematic, side view of an optical system 100A. The optical system 100A is a projection system. For example, the optical system 100A is a projection light engine for virtual reality or augmented reality related applications. In another example, the optical system 100A is utilized as an imaging camera in a metrology system for testing image quality or optical performance of virtual reality or augmented reality display components. In other examples, the optical system 100A is utilized in a microscope or telescope assembly. The optical system 100A includes a display 102, a lens system 104, and a light injection port 106.

In one embodiment, which can be combined with other embodiments described herein, the display 102 is a display panel, micro-display, a reticle with a pattern, or other image producing device. In embodiments where the display 102 is a reticle, the size of the reticle is between about 10 mm and about 40 mm. In one embodiment, which can be combined with other embodiments described herein, an intermediate image from a primary lens of a telescope or microscope is rendered by the display 102. The display 102 is configured to render an image that is projected to the light injection port 106. The display 102 includes a plurality of pixels 108R, 108G, 108B. The plurality of pixels 108R, 108G, 108B combine to render the image. Although only three pixels are shown in FIG. 1A for ease of explanation, a display 102 is not limited in the number of pixels that are located on the display 102. The pixel 108R corresponds to a red pixel, the pixel 108G corresponds to a green pixel, and the pixel 108B corresponds to a blue pixel. Each pixel 108R, 108G, 108B emits a light wave 110. For example, the pixel 108R emits a light wave 110R, the pixel 108G emits a light wave 110G, and the pixel 108B emits a light wave 110G. The light wave 110R, 110G, 110B are collectively referred to as the light waves 110.

The light waves 110 are emitted from the display 102 to the lens system 104. The lens system 104 includes three or more lens groups. For example, the lens system 104 includes a first lens group 112, a second lens group 114, and a third lens group 116. The second lens group 114 is disposed between the first lens group 112 and the third lens group 116. The multiple lens groups of the lens system 104 are configured to reduce optical aberrations in the optical system 100A, while maintaining high imaging performance. The lens system 104 projects the pattern or image rendered from the display 102 at a finite distance to the infinity. As such, the lens system 104 is telecentric. The lens system 104 has an effective focal length of between about 10 mm and about 30 mm. The total mass of the lens system 104 is between about 50 g and about 200 g.

The light injection port 106 is configured to receive the light waves 110 from the lens system 104. For example, the light injection port 106 may be an augmented, virtual, mixed/merged reality device, or other pupil expanding device. Examples of such devices include waveguide displays or other head mounted displays used in augmented reality glasses or goggles and the like. In some examples, the light injection port 106 corresponds to a human eye for use in microscope or telescope applications. In some examples, the light injection port 106 corresponds to an effective entrance aperture to mimic a human eye location during the metrology of a virtual reality or augmented reality display. In some examples, the light injection port 106 is one of a waveguide combiner or a metasurface-based combiner.

The maximum diameter of the lens system 104 is defined as maximum aperture 115. For example, the maximum aperture 115 is between about 20 mm and about 50 mm. The lens system 104 forms a pupil outside of the lens system 104 on a pupil plane 118. The pupil is defined as the fourier image of the image producing device. The pupil is formed where the light waves 110 intersect at the pupil plane 118 (e.g., where light waves across entire field of view intersect). As shown, the pupil plane 118 is external of the lens system 104. In some embodiments, which can be combined with other embodiments described herein, the pupil plane 118 is aligned with the light injection port 106. The distance between the lens system 104 and the pupil plane 118 is defined as pupil relief distance 120. The pupil relief distance 120 is between about 1 mm and about 10 mm. The pupil has a pupil diameter 124 defined as the diameter of the pupil on the pupil plane 118. The pupil diameter 124 is between about 1 mm and about 6 mm. A field of view 122 of the lens system 104 is defined as the angle through which the light waves 110 are incident on the light injection port 106. The lens system 104 is a telecentric lens system, which improves uniform brightness of the image.

By having the pupil plane 118 aligned with the light injection port 106, performance of the optical system 100A is improved. For example, when the light injection port 106 is a waveguide, the lens system 104 allows for the light waves 110 to be efficiently coupled in and out of waveguide. The lens system 104 is capable of a wide field of view 122 and has a large pupil relief distance 120 while also achieving high modulation transfer function (MTF) performance. The lens system 104 includes a field of view 122 greater than about 80 degrees, pupil diameter 124 greater than about 3 mm, and the pupil relief distance 120 is greater than about 5 mm. Additionally, the lens system 104 has a modulation transfer function (MTF) performance greater than about 0.3 at 30 cycles per degree. The MTF performance measures the loss in contrast between the display 102 and the image formed on the light injection port 106.

The lens system 104 includes a first lens group 112, a second lens group 114, and a third lens group 116. The combination of the first lens group 112, the second lens group 114, and the third lens group 116 in combination combat optical aberrations that may occur during use of the optical system 100A. For example, the lens system 104 reduces severe coma aberration, lateral color, field curvature, astigmatism, distortion and other optical aberrations. Each lens group of the lens system 104 includes one or more lens elements 126. Each lens element 126 is an optical component with refractive power. For example, the lens elements 126 may be one or more of a relay lens, a positive meniscus lens, a negative meniscus lens, a convex lens, concave lens, or doublet lens. Each lens element 126 is made from optical glass, polymer, resin or any other refractive optical materials. Each lens element 126 can include a standard spherical surface, conic surface, aspherical surface, free form surface, diffractive surface or combinations thereof.

The first lens group 112 is a double gaussian lens. The first lens group 112 is configured to prevent off-axis aberrations including coma, lateral color, and astigmatism which leads to high symmetry of the light waves 110 incident on the first lens group. For example, when the light waves 110 are incident on the first lens group 112 with off-axis aberrations, the first lens group 112 improves the symmetry of the light waves 110. In one embodiment, which can be combined with other embodiments described herein, the first lens group 112 is a double Gauss lens. In another embodiment, which can be combined with other embodiments described herein, the first lens group 112 can include any number of the lens elements 126 such that the first lens group 112 is any lens stack which improves symmetry of the light waves 110. In other words, the first lens group 112 relays an image to the center of the second lens group 114.

The second lens group 114 is a flat-field lens. The second lens group 114 is configured to handle field curvature of the light waves 110. In one embodiment, which can be combined with other embodiments described herein, the second lens group 114 includes a meniscus lenses and a bi-convex field lens adjacent to eachother. In other words, the second lens group 114 corrects the curvature of the light waves 110. For example, the light waves 110 become flatter after passing through the second lens group 114.

The third lens group 116 includes a bi-convex lens and a positive meniscus lens. The third lens group 116 is configured to form the pupil on the pupil plane 118 outside of the lens system 104 with large pupil relief distance 120. The third lens group 116 is an eyepiece lens.

Figure 1B:
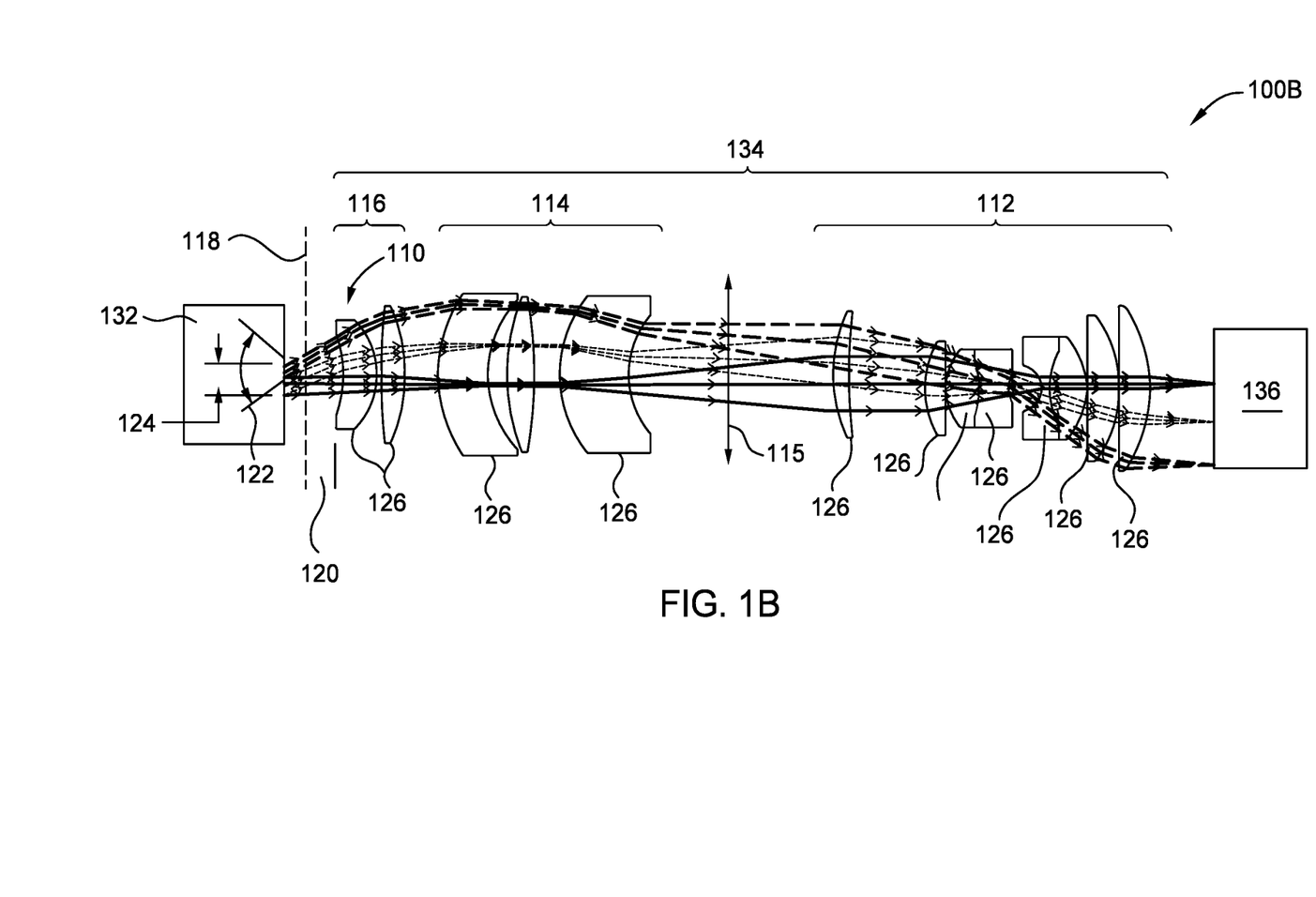

FIG. 1B is a schematic, side view of an optical system 100B. The optical system 100A is an imaging system. For example, the optical system 100B may be used for sensing operations. In other examples, the optical system 100B is utilized in a wide-angle camera or sensor lens. The optical system 100B includes a virtual display 132, a lens system 134, and a sensor 136.

In one embodiment, which can be combined with other embodiments described herein, the virtual display 132 is a virtual display from an AR or VR device. For example, the virtual display 132 includes a virtual image from a waveguide display. The virtual display 132 is configured to collect light from infinity and form an image from the virtual display 132 on a flat surface (e.g., the sensor 136). The virtual display 132 emits one or more light waves 110 from infinity to the lens system 134. For example, the virtual display 132 emits a light wave 110R, a light wave 110G, and a light wave 110G. The light wave 110R, 110G, 110B are collectively referred to as the light waves 110.

The light waves 110 are emitted from the virtual display 132 to the lens system 134. The lens system 134 includes three or more lens groups. For example, the lens system 104 includes a first lens group 112, a second lens group 114, and a third lens group 116. The lens system 134 is similar to the lens system 104, however the first lens group 112 and the third lens group 116 are switched positions. The second lens group 114 is disposed between the first lens group 112 and the third lens group 116. The multiple lens groups of the lens system 104 are configured to reduce optical aberrations in the optical system 1006, while maintaining high imaging performance. The lens system 134 has an effective focal length of between about 10 mm and about 30 mm. The total mass of the lens system 134 is between about 50 g and about 200 g.

The sensor 136 is configured to receive the light waves 110 from the lens system 134. For example, the sensor 136 is an active-pixel sensor, which includes a plurality of pixel sensor unit cells configured to sense each light wave 110. Examples of such devices include CMOS or CCD sensors. In some examples, the sensor 136 is included in a camera system used for capturing images.

The maximum diameter of the lens system 134 is defined as maximum aperture 115. For example, the maximum aperture 115 is between about 20 mm and about 50 mm. A pupil is formed outside of the lens system 134 on a pupil plane 118. The pupil is defined as the fourier image of the sensor 136. The pupil is formed between the virtual display 132 and the lens system 134. The pupil is formed where the light waves 110 intersect at the pupil plane 118. As shown, the pupil plane 118 is external of the lens system 134. The distance between the lens system 134 and the pupil plane 118 is defined as pupil relief distance 120. The pupil relief distance 120 is between about 1 mm and about 10 mm. The pupil has a pupil diameter 124 defined as the diameter of the pupil on the pupil plane 118. The pupil diameter 124 is between about 1 mm and about 6 mm. A field of view 122 of the lens system 134 is defined as the angle through which the light waves 110 are projected from the virtual display 132. The optical system 1006 is configured to be a wide angle system with a field of view greater than about 80 degrees.

The lens system 104 is capable of a wide field of view 122 and has a large pupil relief distance 120 while also achieving high modulation transfer function (MTF) performance. The lens system 104 includes a field of view 122 greater than about 80 degrees, pupil diameter 124 greater than about 3 mm, and the pupil relief distance 120 is greater than about 5 mm. Additionally, the lens system 104 has a modulation transfer function (MTF) performance greater than about 0.3 at 30 cycles per degree. The MTF performance measures the loss in contrast between the display 102 and the image formed on the light injection port 106.

The lens system 134 includes a first lens group 112, a second lens group 114, and a third lens group 116. The combination of the first lens group 112, the second lens group 114, and the third lens group 116 in combination combat optical aberrations that may occur during use of the optical system 1006. For example, the lens system 134 reduces severe coma aberration, lateral color, field curvature, astigmatism, distortion and other optical aberrations. Each lens group of the lens system 134 includes one or more lens elements 126. Each lens element 126 is an optical component with refractive power. For example, the lens elements 126 may be one or more of a relay lens, a positive meniscus lens, a negative meniscus lens, a convex lens, concave lens, or doublet lens. Each lens element 126 is made from optical glass, polymer, resin or any other refractive optical materials. Each lens element 126 can include a standard spherical surface, conic surface, aspherical surface, free form surface, diffractive surface or combinations thereof.

The third lens group 116 includes a bi-convex lens and a positive meniscus lens. The third lens group 116 is configured to form the pupil on the pupil plane 118 outside of the lens system 134 with large pupil relief distance 120. The third lens group 116 is an eyepiece lens.

The second lens group 114 is a flat-field lens. The second lens group 114 is configured to handle field curvature of the light waves 110. In one embodiment, which can be combined with other embodiments described herein, the second lens group 114 includes a meniscus lenses and a bi-convex field lens adjacent to each other. In other words, the second lens group 114 corrects the curvature of the light waves 110. For example, the light waves 110 become flatter after passing through the second lens group 114.

The first lens group 112 is a double gaussian lens. The first lens group 112 is configured to prevent off-axis aberrations including coma, lateral color, and astigmatism which leads to high symmetry of the light waves 110 incident on the first lens group. For example, when the light waves 110 are incident on the first lens group 112 with off-axis aberrations, the first lens group 112 improves the symmetry of the light waves 110. In one embodiment, which can be combined with other embodiments described herein, the first lens group 112 is a double Gauss lens. In another embodiment, which can be combined with other embodiments described herein, the first lens group 112 can include any number of the lens elements 126 such that the first lens group 112 is any lens stack which improves symmetry of the light waves 110. In other words, the first lens group 112 relays an image to the center of the second lens group 114.

Figure 2:
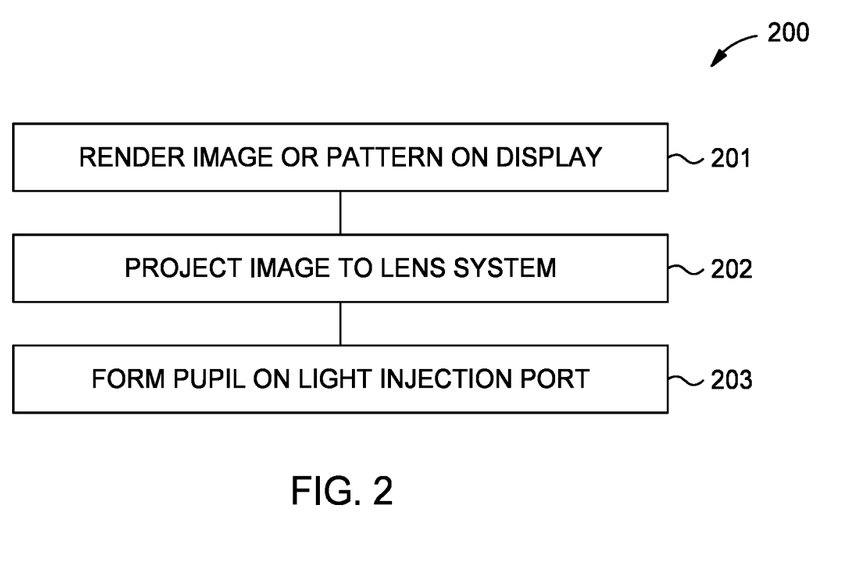
FIG. 2 is a flow diagram of a method of projecting light waves with an optical system, according to embodiments described herein.

FIG. 2 is a flow diagram of a method 200 of projecting light waves with an optical system 100A. The method 200 may be utilized in operation of a projection light engine for virtual reality or augmented reality related applications. In another example, the method 200 is utilized during a metrology system for testing various metrics of different optical components. In other examples, the optical system 100A is utilized in a microscope or telescope assembly. The method 200 is utilized in conjunction with the optical system 100A.

At operation 201, an image or pattern is rendered on a display 102. A light source may be included in the display 102 or adjacent to the display 102. A plurality of light waves 110 (e.g., light waves 110R, 110G, 110B) corresponding to a plurality of pixels 108R, 108G, 108B render the image. The plurality of light waves 110 are projected to the lens system 104.

At operation 202, the image is projected to the lens system 104. The lens system 104 includes a first lens group 112, a second lens group 114, and a third lens group 116. The lens system 104 is capable of producing a large field of view (e.g., greater than about 80 degrees) and has a pupil relief distance 120 greater than about 5.5 mm. The lens system 104 forms a pupil outside of the lens system 104 on a pupil plane 118. The pupil is defined as the virtual image of the maximum aperture. The pupil is formed where the light waves 110 intersect at the pupil plane 118. As shown, the pupil plane 118 is external of the lens system 104. The first lens group 112 is configured to reduce off-axis symmetry. The second lens group 114 is configured for flattening of the field of the light waves 110, and the third lens group 116 is the eyepiece group for forming the pupil outside of the lens system 104.

At operation 203, the pupil is formed at the pupil plane 118 on the light injection port 106. The pupil is formed between the light injection port 106 and the lens system 104. The image rendered by the display 102 is projected to the light injection port 106. The image is projected to infinity. In some examples, the light injection port 106 is configured to receive the light waves 110 from the lens system 104 to incouple the light waves 110 into a waveguide combiner. In another example, the light injection port 106 is a human eye for receiving the light waves 110 for telescopes or microscopes. In some examples, the light injection port 106 corresponds to an optical component that is being analyzed during a metrology operation.

By having the pupil plane 118 aligned with the light injection port 106, performance of the optical system 100A is improved. For example, when the light injection port 106 is a waveguide, the lens system 104 allows for the light waves 110 to be efficiently coupled in and out of waveguide. The combination of the first lens group 112, the second lens group 114, and the third lens group 116 in combination combat optical aberrations that may occur during use of the optical system 100A. The lens system 104 is capable of a wide field of view 122 and has a large pupil relief distance 120 while also achieving high modulation transfer function (MTF) performance. Additionally, the pupil relief distance 120 allows for rotation of the light injection port 106, as needed.

Figure 3:
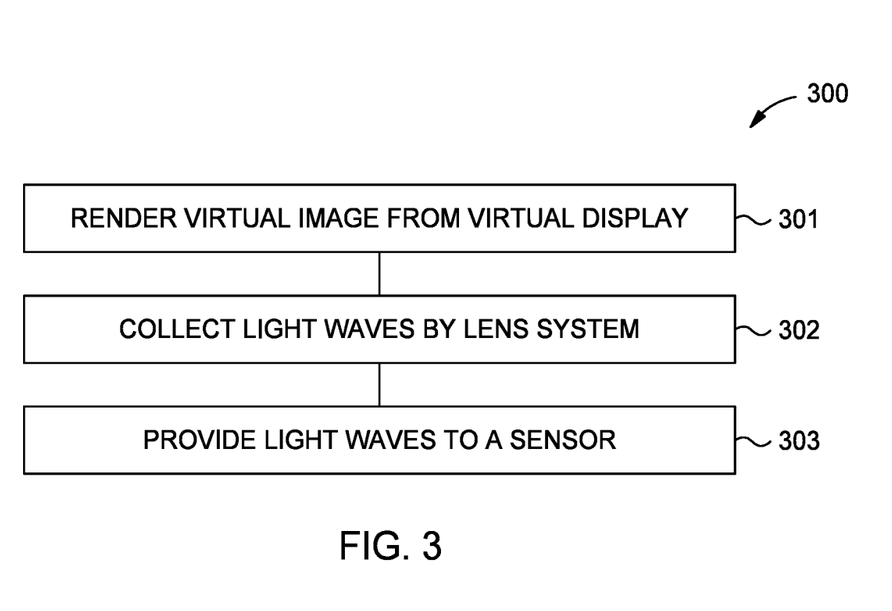
FIG. 3 is a flow diagram of a method of imaging light waves with an optical system, according to embodiments described herein.

FIG. 3 is a flow diagram of a method 300 of imaging light waves with an optical system 100B. The method 200 may be utilized in operation of an imaging system. For example, the optical system 100B may capture images of a virtual image from an AR or VR device, such as a waveguide combiner. The method 300 is utilized in conjunction with the optical system 100B, shown in FIG. 1B.

At operation 301, a virtual display 132 renders a virtual image from infinity. A plurality of light waves 110 (e.g., light waves 110R, 110G, 110B) at infinity correspond to the virtual display 132. In some examples, the virtual display 132 renders an image from an AR or VR device.

At operation 302, the light waves are collected by the lens system 134. The lens system 134 includes a third lens group 116, a second lens group 114, and a first lens group 112, in order from the virtual display 132. The lens system 134 is capable of collecting the light waves 110 from a large field of view (e.g., greater than about 80 degrees) and has a pupil relief distance 120 greater than about 5.5 mm. A pupil outside of the lens system 134 is formed on a pupil plane 118 between the virtual display 132 and the lens system 134. The pupil is defined as the virtual image of the maximum aperture 115. As shown, the pupil plane 118 is external of the lens system 104. The first lens group 112 is configured to reduce off-axis symmetry. The second lens group 114 is configured for flattening of the field of the light waves 110, and the third lens group 116 is the eyepiece group for forming the pupil outside of the lens system 104.

At operation 303, the lens system 134 provides the light waves 110 to a sensor 136. The lens system 134 provides an image from the virtual display to the sensor 136. The sensor 136 may be utilized to capture the image, for example as a camera system. The lens system 134 is capable of a wide field of view 122 and has a large pupil relief distance 120 while also achieving high modulation transfer function (MTF) performance. Additionally, the pupil relief distance 120 allows for rotation of the light injection port 106, as needed. The combination of the first lens group 112, the second lens group 114, and the third lens group 116 in combination combat optical aberrations that may occur during use of the optical system 100B. Additionally, the longer pupil relief distance 120 allows for an easier assembly process of the optical system 1006 and allows for rotation of the optical system 1006 as needed to collect the light waves 110. For example, the optical system 100B is able to rotate around the external pupil position.

Figure 4:
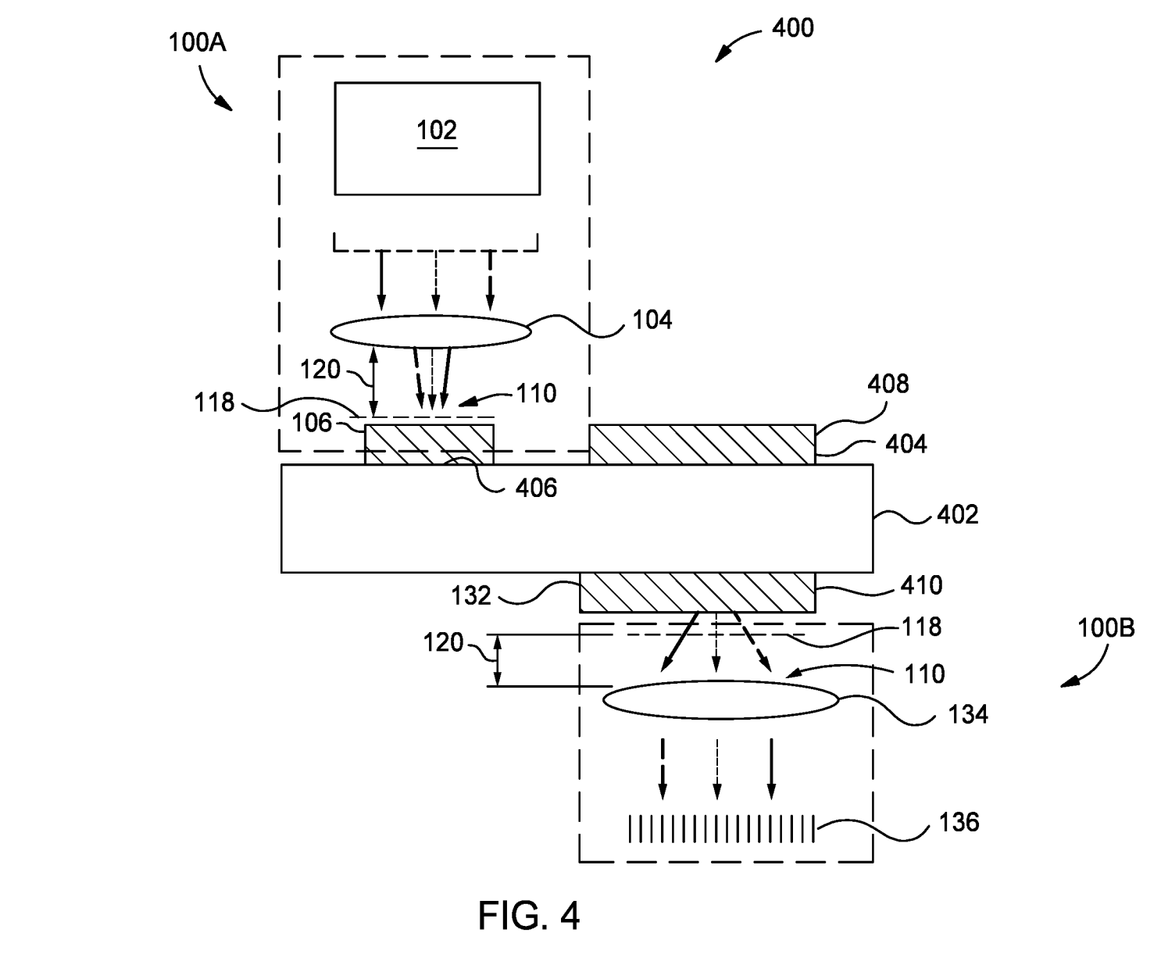
FIG. 4 is a schematic, cross-sectional view of an optical system, according to embodiments described herein.

FIG. 4 is a schematic, cross-sectional view of an optical system 400. The optical system 400 includes a substrate 402 and a waveguide structure 404. The optical system 400 includes an input coupling region 406, a waveguide region 408, and an output coupling region 410. The waveguide region 408 is located between the input coupling region 406 and the output coupling region 410. The waveguide structure 404 is disposed on and in contact with the substrate 402.

The waveguide structure 404 is implemented in a display device, such as an augmented, virtual, or mixed/merged reality device. Examples of such devices include waveguide combiners or other head mounted displays used in augmented reality glasses or goggles and the like. Accordingly, the optical system 400 may also include an optical system 100A which generates light waves 110 to form a virtual image at a light injection port 106 (corresponding to the input coupling region 406). The light waves travel through a lens system 104 prior to being incident on the light injection port 106. The lens system 104 forms an external pupil on a pupil plane 118. The light waves 110 generated by the optical system 100A are modulated by the waveguide structure 404 and propagates through the waveguide structure 404 and substrate 402 until the light waves 110 exits the waveguide structure 404 and is imaged (e.g. focused) on the sensor 136. The virtual image is projected from the virtual display 132 (corresponding to the output coupling region 410) to the lens system 134. The light waves 110 pass through a lens system 134 and direct the light waves to the sensor 136.

The lens systems 134 improve overall performance of incoupling the light waves 110 to the input coupling region 406 and improve mechanical set up of the optical system 400. The pupils that are formed outside of the lens systems allow for improved field of view with high resolution with high MTF performance.

In summation, an optical system having a lens system configured to have a wide field of view and high resolution is provided herein. The optical system may be an image projection system or an imaging system. The optical system includes three or more lens groups with ability to combat optical aberrations and produce a pupil outside of the lens group. The lens system as an image projection system projects a pattern or image rendered on a flat reticle or display of finite distance to the infinity. In an imaging system, the lens system collects light from infinity and forms an image of that object on a sensor. The lens system improves overall performance of the optical system.

While the foregoing is directed to some embodiments, other and further embodiments may be devised without departing from the basic scope thereof, and the scope thereof is determined by the claims that follow.

What is claimed is:

1. An optical system, comprising:
   a display configured to render an image by projecting a plurality of light waves emanating from at least two pixels spaced apart from each other;
   a lens system, the lens system comprising:
      a first lens group configured to relay the emanating light waves to a center of the lens system and focus the emanating light waves within the first lens group;
      a second lens group adjacent to the first lens group, the second lens group configured to flatten a field of the emanating light waves; and
      a third lens group adjacent to the second lens group, wherein the third lens group is configured to form a single pupil on a pupil plane outside of the lens system; and
   a light injection port, wherein the pupil plane is aligned with the light injection port and the emanating light waves are projected to the light injection port, wherein the light injection port is an input coupling region of a waveguide structure.

2. The optical system of claim 1, wherein a field of view of the lens system is greater than about 80 degrees.

3. The optical system of claim 1, wherein the lens system is a telecentric lens system.

4. The optical system of claim 1, wherein the lens system has a modulation transfer function (MTF) performance greater than about 0.3 at 30 cycles per degree.

5. The optical system of claim 1, wherein a pupil diameter of the pupil is between about 1 mm and about 6 mm.

6. The optical system of claim 1, wherein the first lens group is a double Gauss lens.

7. The optical system of claim 1, wherein the second lens group is a flat-field lens.

8. The optical system of claim 1, wherein the second lens group includes at least a meniscus lens and a bi-convex field lens adjacent to the meniscus lens.

9. The optical system of claim 1, wherein the third lens group includes at least a bi-convex lens and a positive meniscus lens.

10. The optical system of claim 1, wherein the second lens group is disposed between the first lens group and the third lens group.

11. The optical system of claim 1, wherein:
    the first lens group is a double Gauss lens;
    the second lens group includes at least a meniscus lens and a bi-convex field lens adjacent to the meniscus lens; and
    the third lens group includes at least a bi-convex lens and a positive meniscus lens.

12. A lens system, comprising:
    a first lens group configured to relay a plurality of light waves, the plurality of light waves comprising a first light wave and a second light wave, generated from a display comprising at least two pixels spaced apart from each other to a center of the lens system and focus the plurality of light waves within the first lens group, the at least two pixels including a first pixel and a second pixel, the first pixel emitting the first light wave and the second pixel emitting the second light wave, wherein the first lens group is a double Gauss lens and focusing the plurality of light waves comprises intersecting the first light wave and the second light wave;
    a second lens group adjacent to the first lens group, wherein the second lens group is a flat-field lens configured to flatten the plurality of light waves, wherein flattening the plurality of light waves comprises converging the first light wave to a first point and converging the second light wave to a second point, wherein the first point and the second point are separated by a distance; and
    a third lens group adjacent to the second lens group, wherein the third lens group includes a bi-convex lens and a positive meniscus lens and is configured to form a single pupil on a pupil plane outside of the lens system.

13. The lens system of claim 12, wherein the second lens group is disposed between the first lens group and the third lens group.

14. The lens system of claim 12, wherein a field of view of the lens system is greater than about 80 degrees.

15. The lens system of claim 12, wherein the lens system is a telecentric lens system.

16. The lens system of claim 12, wherein the lens system has a modulation transfer function (MTF) performance greater than about 0.3 at 30 cycles per degree.

17. The lens system of claim 12, wherein a pupil diameter of the pupil is between about 1 mm and about 6 mm.

18. A method of using a lens system, comprising:
    projecting a plurality of light waves, comprising a first light wave and a second light wave, from a display comprising at least two pixels spaced apart from each other to a lens system, the at least two pixels including a first pixel and a second pixel, the first pixel projecting the first light wave and the second pixel projecting the second light wave, wherein the lens system includes:
       a first lens group configured to relay the first light wave and the second light wave to a center of the lens system and focus the light waves within the first lens group, wherein the first lens group is a double Gauss lens and the first light wave and the second light wave intersect one another at the center of the first lens group;
       a second lens group adjacent to the first lens group, wherein the second lens group is a flat-field lens configured to flatten the first light wave and the second light wave parallel to one another, wherein the first light wave and the second light wave are separated by a distance; and a third lens group adjacent to the second lens group, wherein the third lens group includes a bi-convex lens and a positive meniscus lens and is configured to form a single pupil on a pupil plane outside of the lens system; and projecting the light waves to a light injection port, wherein the formed pupil on a pupil plane is outside of the lens system.

19. The method of claim 18, wherein the third lens group is configured to prevent off-axis aberrations including coma, lateral color, and astigmatism.

20. The method of claim 18, wherein the light injection port is an input coupling region of a waveguide structure.

* * * * *